(12) United States Patent
Hiraguchi

(10) Patent No.: US 7,407,126 B2
(45) Date of Patent: *Aug. 5, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 443 days.

This patent is subject to a terminal disclaimer.

(21) Appl. No.: 10/897,117

(22) Filed: Jul. 23, 2004

(65) Prior Publication Data
US 2005/0023395 A1 Feb. 3, 2005

(30) Foreign Application Priority Data
Jul. 31, 2003 (JP) ............... 2003-284296

(51) Int. Cl.
*G11B 23/107* (2006.01)
(52) U.S. Cl. .................... 242/338.1; 242/348
(58) Field of Classification Search ............. 242/388.1, 242/388.3, 348, 348.1, 348.2, 348.3; 360/132
See application file for complete search history.

(56) References Cited

U.S. PATENT DOCUMENTS

| | | | |
|---|---|---|---|
| 4,723,731 A | 2/1988 | Poso | |
| 5,027,249 A | 6/1991 | Johnson et al. | |
| 5,893,527 A | 4/1999 | Mizutani et al. | |
| 5,901,916 A * | 5/1999 | McAllister et al. | 242/348 |
| 6,113,020 A * | 9/2000 | Nayak | 242/348 |
| 6,164,579 A | 12/2000 | Todd | |
| 6,264,126 B1 | 7/2001 | Shima et al. | |
| 6,273,352 B1 | 8/2001 | Johnson et al. | |
| 6,315,230 B1 | 11/2001 | Hansen et al. | |
| 6,411,466 B1 * | 6/2002 | Shima et al. | 360/132 |
| 6,452,747 B1 | 9/2002 | Johnson et al. | |
| 6,563,671 B2 * | 5/2003 | Morita et al. | 360/132 |

(Continued)

FOREIGN PATENT DOCUMENTS

JP 3-187022 8/1991

(Continued)

OTHER PUBLICATIONS

Japanese Decision of Refusal dated Apr. 1, 2008 issued against the corresponding Japanese Patent Appln. No. 2003-284296.

*Primary Examiner*—Peter M. Cuomo
*Assistant Examiner*—Scott Haugland
(74) *Attorney, Agent, or Firm*—Sughrue Mion, PLLC

(57) ABSTRACT

A recording tape cartridge with a reel in a case, a hollow cylinder shaped hub and a recording tape wound around the hub has a braking member provided so as to be unrotatable within the case. The braking member can be set at a locking position, at which the braking member engages with an engaging portion formed at a top surface of a floor of the hub and impedes rotation of the reel, and a rotation permitting position, at which engagement with the engaging portion is cancelled due to the braking member moving away from the top surface of the floor of the hub due to pushing-up of an operation portion which is inserted through a pass-through hole of the hub. A guide wall, which extends toward the braking member and always opposes a side surface of the operation portion, is formed at a peripheral edge of the hole.

7 Claims, 7 Drawing Sheets

U.S. PATENT DOCUMENTS

| | | |
|---|---|---|
| 6,568,619 B1 | 5/2003 | Shiga et al. |
| 6,581,866 B2 | 6/2003 | Tsuyuki et al. |
| 6,687,086 B2 | 2/2004 | Morita et al. |
| 6,736,345 B2 | 5/2004 | Hiraguchi et al. |
| 6,886,765 B2 * | 5/2005 | Amano et al. ............ 242/338.1 |
| 6,913,218 B2 * | 7/2005 | Ishihara ................... 242/345.2 |
| 7,059,554 B2 * | 6/2006 | Hiraguchi et al. ........ 242/338.1 |

FOREIGN PATENT DOCUMENTS

| | | |
|---|---|---|
| JP | 04-2374 | 1/1992 |
| JP | 11-53862 A | 2/1999 |
| JP | 11-185437 | 7/1999 |
| JP | 11-238352 A | 8/1999 |
| JP | 2000-57828 | 2/2000 |
| JP | 2000-182354 A | 6/2000 |
| JP | 2004-273014 A | 9/2004 |
| WO | WO 9965032 A1 * | 12/1999 |

* cited by examiner

F I G . 2
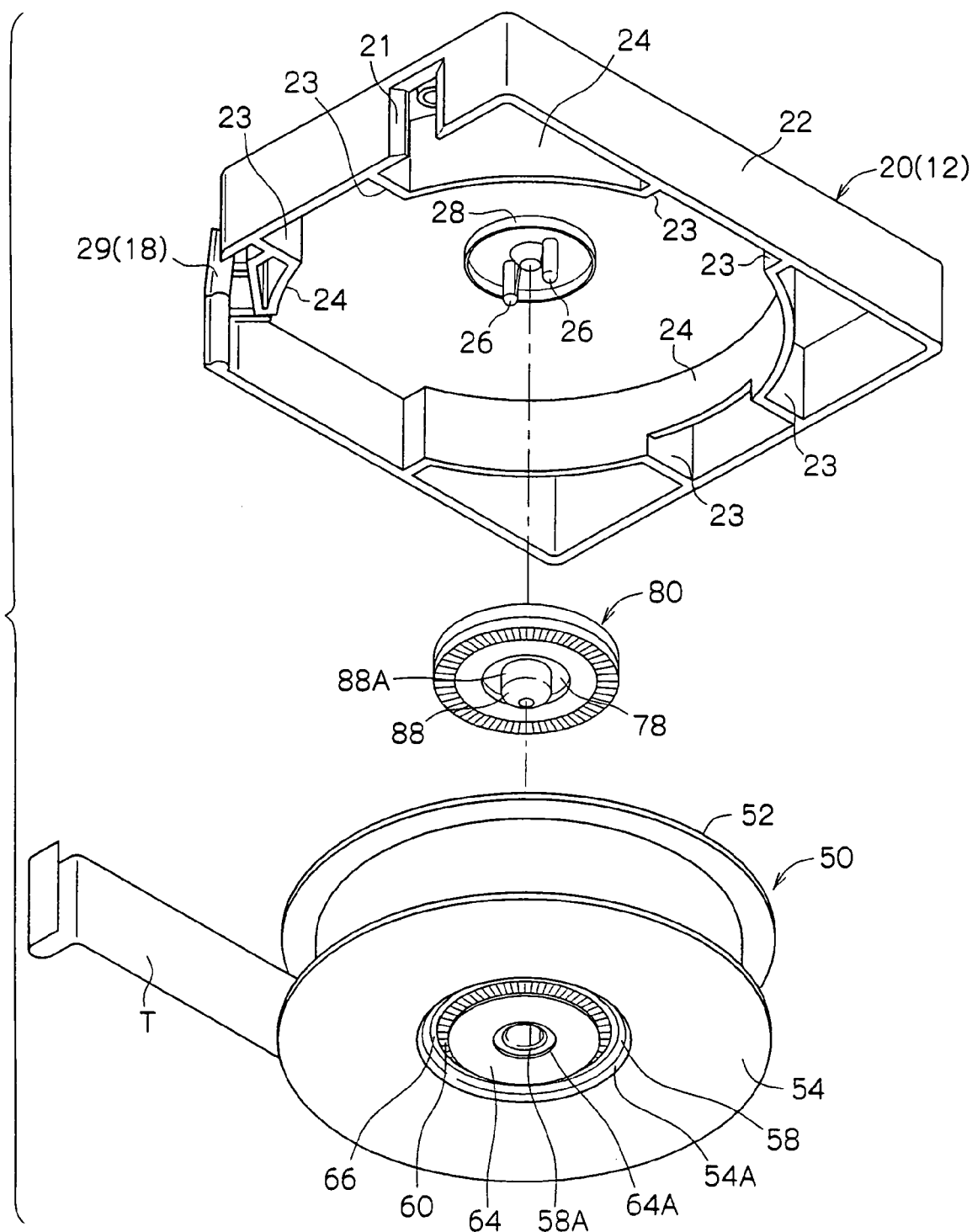

US 7,407,126 B2

RECORDING TAPE CARTRIDGE

CROSS-REFERENCE TO RELATED APPLICATION

This application claims priority under 35 USC 119 from Japanese Patent Application No. 2003-284296, the disclosure of which is incorporated by reference herein.

BACKGROUND OF THE INVENTION

1. Technical Field

The present invention relates to a recording tape cartridge which accommodates, within a case, a single reel on which is wound a recording tape such as a magnetic tape or the like used as a recording/playback medium mainly for computers or the like.

2. Description of the Related Art

Conventionally, recording tape cartridges (magnetic tape cartridges) have been known in which a magnetic tape, which is used as a data recording/playback medium for computers or the like, is wound on a single reel, and the reel is accommodated within a case formed of a synthetic resin. Such a recording tape cartridge is equipped with a braking means so that the reel does not rotate within the case when the recording tape cartridge is not being used (is not loaded in a drive device).

As the braking means, there are structures which, for example, cause a braking member, which cannot rotate with respect to the case, to engage with the reel, or the like. Namely, as shown in FIG. 7, a braking member 130 is formed in the shape of a disc which is accommodated so as to be movable upward and downward within a reel hub 112 of a reel 110. The reel hub 112 is formed in the shape of a hollow cylinder having a floor. A pair of engaging projections 134, which are substantially U-shaped as seen in plan view, stand erect from the top surface of the braking member 130. A pair of rotation restricting ribs 126, which are provided vertically from the inner surface of an upper case 122, are inserted in the engaging projections 134, such that the braking member 130 cannot rotate with respect to a case 120. Moreover, by an urging means such as a compression coil spring 116 or the like, the braking member 130 is always urged toward a floor wall 114 of the reel hub 112, and an annular braking gear 132, which is formed at the bottom surface of the braking member 130, is made to mesh together with an annular engaging gear 118 which is formed at the top surface of the floor wall 114 of the reel hub 112. Inadvertent rotation of the reel 110 is thereby impeded.

A substantially solid cylindrical operation projection 136 projects at the axially central portion of the bottom surface of the braking member 130. The operation projection 136 is inserted in a pass-through hole 114A formed in the axially central portion of the floor wall 114 of the reel hub 112, and faces a gear opening 128 formed in the substantially central portion of a lower case 124. Accordingly, when the reel 110 is to be made to be rotatable, the operation projection 136 (the braking member 130) is pushed upward, such that the meshing-together of the braking gear 132 with the engaging gear 118 is cancelled (see, for example, U.S. Pat. No. 6,452,747).

However, with such a structure in which the meshing-together of the braking gear 132 with the engaging gear 118 is cancelled by the operation projection 136 (the braking member 130) being pushed upward in this way, if a user carelessly pushes the operation projection 136 upward in fun or the like, as shown in the figure, there are cases in which the braking member 130, in a tilted state, anchors on the peripheral edge portion of the pass-through hole 114A (i.e., tilts). If the recording tape cartridge is loaded into a drive device in this state, not only will recording and playback not be possible, but also, breakage of the recording tape cartridge or malfunctioning of the drive device may be caused. Moreover, there is also the problem that it is easy for dust and the like to enter in from the pass-through hole 114A.

SUMMARY OF THE INVENTION

An object of the present invention is to provide a recording tape cartridge in which, when the recording tape cartridge is not being used, even if an operation projection (a braking member) is carelessly pushed upward, a state in which the braking member tilts will not arise.

In order to achieve the above-described object, a recording tape cartridge relating to the present invention comprises: a reel rotatably accommodated within a case, a recording tape being wound around an outer peripheral surface of a hub which is shaped as a hollow cylinder having a floor and in whose axially central portion a pass-through hole is formed; and a braking member provided so as to be unable to rotate within the case, the braking member being able to be set at a locking position, at which the braking member engages with an engaging portion formed at a top surface of a portion of the floor of the hub and impedes rotation of the reel, and a rotation permitting position, at which engagement with the engaging portion is cancelled due to the braking member moving away from the top surface of the floor portion of the hub due to pushing-up of an operation portion which is inserted through the pass-through hole, wherein a guide wall portion, which extends toward the braking member and always opposes a side surface of the operation portion, is formed at a peripheral edge portion of the pass-through hole.

In the present invention, the guide wall portion, which extends toward the braking member and always opposes a side surface of the operation portion, is formed at a peripheral edge portion of the pass-through hole which is formed in the floor portion of the hub. Therefore, even if the operation portion is pushed up to its uppermost limit, the operation portion does not come out from the guide wall portion. Accordingly, even if the operation portion is pushed-up carelessly, the problem of the braking member being anchored in a tilted state does not arise at all. Further, owing to the guide wall portion, the operation portion does not come out from the pass-through hole. Therefore, entry of dust or the like in from the pass-through hole can always be suppressed.

Further, in the recording tape cartridge of the present invention, a concave portion, which engages with the guide wall portion, may be formed in the braking member.

In a case in which this concave portion is provided, the concave portion which engages with the guide wall portion is formed in the braking member. Therefore, a maze-like structure can be formed by the guide wall portion and the concave portion. Accordingly, entry of dust or the like in from the pass-through hole can further be suppressed thereby. Thus, adhesion of dust or the like to the recording tape can be prevented.

Moreover, in the above-described recording tape cartridge, a releasing portion of the drive device, which releasing portion pushes-up the operation portion, may be inserted in the pass-through hole substantially without a gap therebetween.

In this case, the releasing portion of the drive device, which releasing portion pushes-up the operation portion, is inserted in the pass-through hole substantially without a gap therebetween. Accordingly, the pass-through hole can be used for positioning the reel with respect to the drive device.

In any case, in accordance with the present invention, the problem of the braking member tilting when the operation portion of the braking member is pushed up does not arise. Moreover, entry of dust and the like into the case can be suppressed.

BRIEF DESCRIPTION OF THE DRAWINGS

FIG. 2 is a schematic perspective view, as seen from below a lower case, of a reel and a braking member.

DETAILED DESCRIPTION OF THE INVENTION

Here, a recording tape cartridge relating to an embodiment of the present invention (which will be called "magnetic tape cartridge" hereinafter) will be summarily described.

Figure 1:
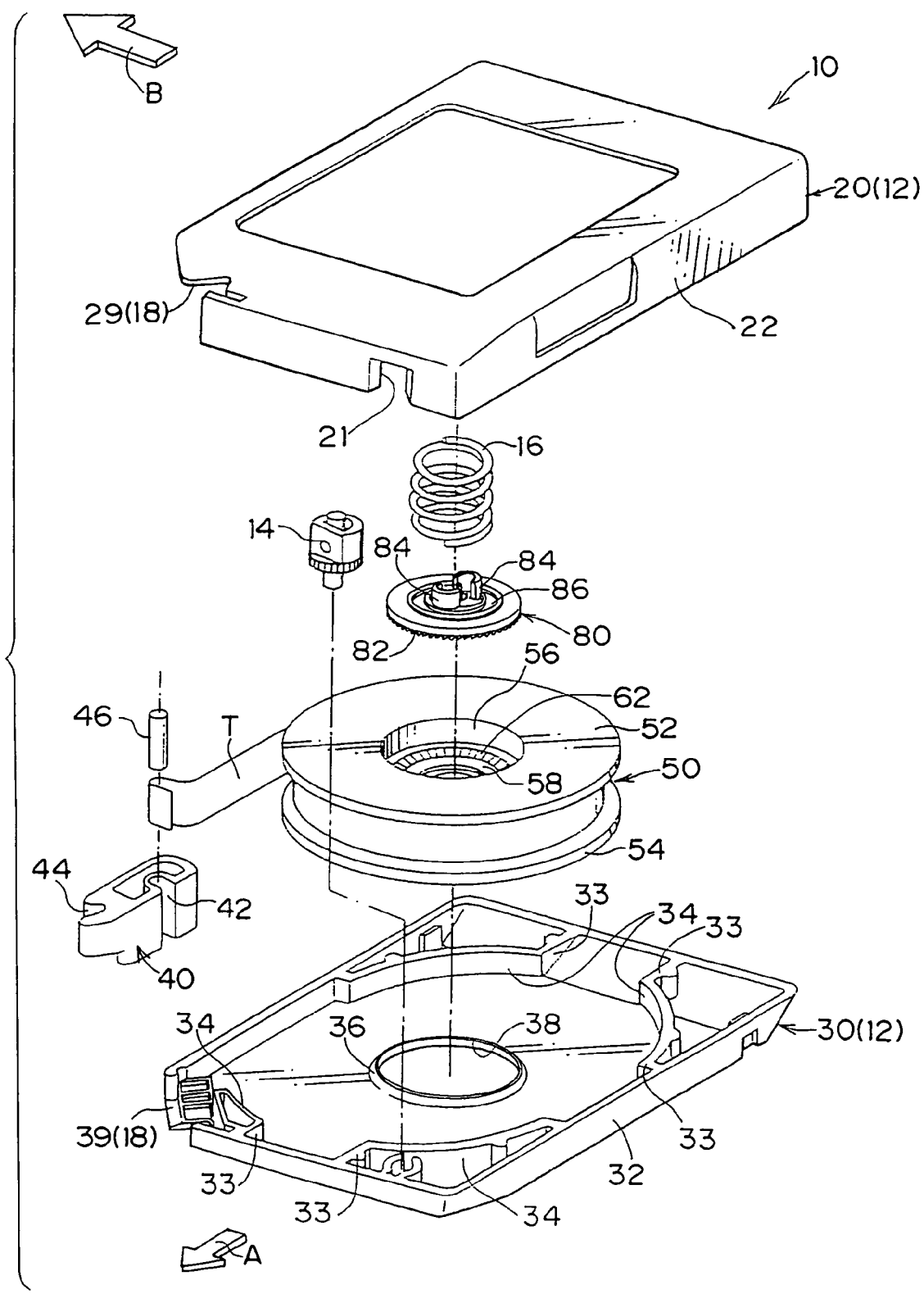
FIG. 1 is a schematic exploded perspective view, as seen from above, of a recording tape cartridge.

For convenience of explanation, the direction of loading a magnetic tape cartridge 10 shown in FIG. 1 into an unillustrated drive device (i.e., the direction of arrow A) will be called the front direction, and the direction of arrow B will be called the downward direction. Front, back, left, right, up and down will be expressed by using, as a reference, a case of looking in the direction of arrow A.

As shown in FIGS. 1 through 5B, the magnetic tape cartridge 10 has a case 12. The case 12 has an upper case 20 and a lower case 30, which are formed of a synthetic resin and joined together by ultrasonic welding or the like in a state in which peripheral walls 22, 32 thereof abut one another. Play restricting walls 24, 34 stand erect at the inner surfaces of the upper case 20 and the lower case 30. Each of the play restricting walls 24, 34 has an inner radius slightly larger than outer radii of an upper flange 52 and a lower flange 54 of a reel 50. The reel 50 is rotatably accommodated at the inner sides of the play restricting walls 24, 34.

A plurality of ribs 23 are provided between the play restricting wall 24 and the peripheral wall 22 of the upper case 20. A plurality of ribs 33 are provided between the play restricting wall 34 and the peripheral wall 32 of the lower case 30. The ribs 23 connect and strengthen the play restricting wall 24 and the peripheral wall 22, and the ribs 33 connect and strengthen the play restricting wall 34 and the peripheral wall 32. Note that a cut-out portion 21, which is substantially rectangular and which shows the indication of a write protect portion 14 as to whether writing is possible or not, is formed in the peripheral wall 22 at the front side of the upper case 20.

The reel 50 is molded of a resin material, and is structured by a reel hub 56 formed in the shape of a hollow cylinder having a floor, an upper flange 52 extending integrally from the upper end portion of the reel hub 56, and a lower flange 54 mounted by welding or the like to the lower end portion of the reel hub 56. The widthwise direction end portions of a magnetic tape T, which serves as an information recording/playback medium wound on the outer peripheral surface of the reel hub 56, are held at the upper flange 52 and the lower flange 54. Note that the reel hub 56 and the lower flange 54 are molded by using resin materials which are compatible with one another, and can be welded together by ultrasonic waves or the like.

A floor wall 58 is provided at the lower flange 54 side of the reel hub 56. A pass-through hole 58A is formed in the axially central portion of the floor wall 58. A reel gear 60 is formed in an annular form at the bottom surface side of the floor wall 58. Due to the reel 50 being pushed against the lower case 30 side by the urging force of a compression coil spring 16 which will be described later, the reel gear 60 is exposed from a circular gear opening 38 formed in the substantial center of the lower case 30, and meshes with a driving gear 102 provided at a rotating shaft 100 of a drive device, and transmits rotational power to the reel 50.

An annular reel plate 64 formed of a resin material and having at the axially central portion thereof a through hole 64A whose diameter is slightly (about 1 mm or less) larger than that of the pass-through hole 58A, is integrally fixed by insert molding or the like at the radial direction inner side of the reel gear 60. In the state in which the driving gear 102 and the reel gear 60 are completely meshed together, the reel plate 64 is attracted by the magnetic force of an annular magnet 106 provided between the driving gear 102 and a releasing projection 104 which will be described later, such that axial offset between the reel 50 and the rotating shaft 100 is prevented, and such that the meshed-together state of the reel gear 60 and the driving gear 102 can be maintained. In accordance with such a structure, when the rotating shaft 100 rotates around its own axis, the reel 50 rotates integrally therewith within the case 12.

An annular projection 66, which is a reference surface, is formed to project at the outer peripheral portion of the reel gear 60. Positioning of the reel 50 in the heightwise direction thereof is carried out by a top surface 108 at the outer peripheral side of the driving gear 102 of the rotating shaft 100 abutting the annular projection 66. Note that the reference surface is not limited to the illustrated annular projection 66, and may be structured by an annular concave portion, or projections which project discretely, or the like (none of which is illustrated). Further, a taper surface 54A is formed at the inner peripheral edge portion of the lower flange 54. The reel 50 is positioned with respect to the lower case 30 due to a position restricting rib 36, which stands erect at the peripheral edge portion of the gear opening 38, engaging with this taper surface 54.

An engaging gear 62 is formed in an annular form in the top surface side of the floor wall 58 of the reel hub 56, and can mesh with a braking gear 82 of a braking member 80 which will be described later. The braking member 80 is formed in the shape of a disc which is accommodated within the reel hub 56 so as to be movable upward and downward. The braking gear 82 is formed in an annular form at the outer peripheral portion of the bottom surface of the braking member 80. A pair of engaging projections 84, which are substantially U-shaped in plan view, stand erect at the top surface of the braking member 80 such that the open sides thereof face one another.

A pair of rotation restricting ribs 26 are provided vertically at the center of the inner surface of the upper case 20, and can engage with the engaging projections 84. An annular groove 86 is formed at the outer side of the engaging projections 84 of the braking member 80. An annular projection 28 projects at the outer side of the rotation restricting ribs 26 of the upper case 20. Due to the compression coil spring 16, which serves as an urging member, being held between the annular projection 28 and the annular groove 86, the compression coil spring 16 is installed between the braking member 80 and the upper case 20.

Accordingly, when the recording tape cartridge 10 is not being used, due to the rotation restricting ribs 26 being inserted in the engaging projections 84, rotation of the braking member 80 with respect to the case 12 is impeded. Due to the urging force of the compression coil spring 16, the braking gear 82 of the braking member 80, whose rotation with respect to the case 12 is impeded, is urged toward the engaging gear 62 in the reel hub 56, and strongly meshes with the engaging gear 62. In this way, when the recording tape cartridge 10 is not in use, inadvertent rotation of the reel 50 is prevented.

An operation projection 88, which is substantially solid and cylindrical, and which can be inserted through the pass-through hole 58A, projects at the center of the bottom surface of the braking member 80. The operation projection 88 can abut the releasing projection 104 which projects at the axially central portion of the rotating shaft 100 of the drive device. Accordingly, when the recording tape cartridge 10 is used (is loaded in a drive device), first, the releasing projection 104 abuts the operation projection 88, and pushes the braking member 80 upward against the urging force of the compression coil spring 16, such that the meshing of the braking gear 82 and the engaging gear 62 is cancelled. Simultaneously therewith, the reel 50 becomes able to rotate due to the reel gear 60 and the driving gear 102 meshing together.

A guide wall portion 70, which extends integrally by a predetermined length upward (i.e., toward the braking member 80), stands erect in an annular form at the peripheral edge portion of the pass-through hole 58 formed in the floor wall 58 of the reel hub 56. The inner peripheral surface of the guide wall portion 70 is a straight portion 72 which is a surface which is perpendicular to the floor wall 58. The length of the straight portion 72 in the heightwise direction thereof is 1 mm to 3 mm, and preferably 2 mm to 3 mm.

The straight portion 72 is a surface along which the releasing projection 104 of the drive device slides (there is actually a gap of about 0.05 μ) when the releasing projection 104 is inserted into the pass-through hole 58A as the releasing projection 104 pushes the operation projection 88 upward. The reel 50 is centered by the straight portion 72 with respect to the rotating shaft 100 (i.e., positioning in the left-right direction is carried out). Note that the inner side of the top end portion of the guide wall portion 70 is an arc-shaped surface 70A, which is formed in the shape of a circular arc as seen in side sectional view, and is for guiding-in the operation projection 88.

Figure 3:
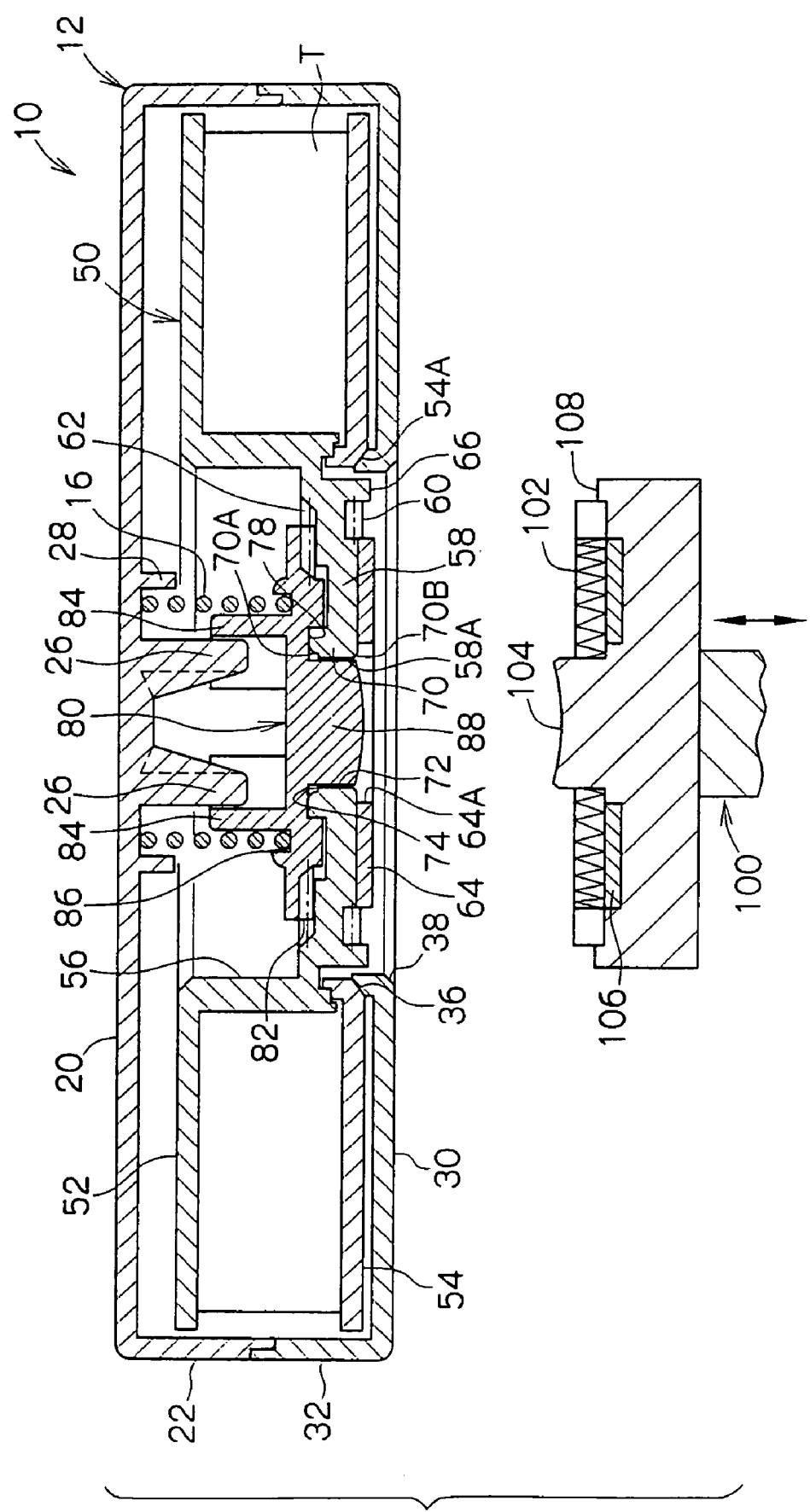
FIG. 3 is a schematic side sectional view showing a state before a rotating shaft meshes with the recording tape cartridge.
Figure 4:
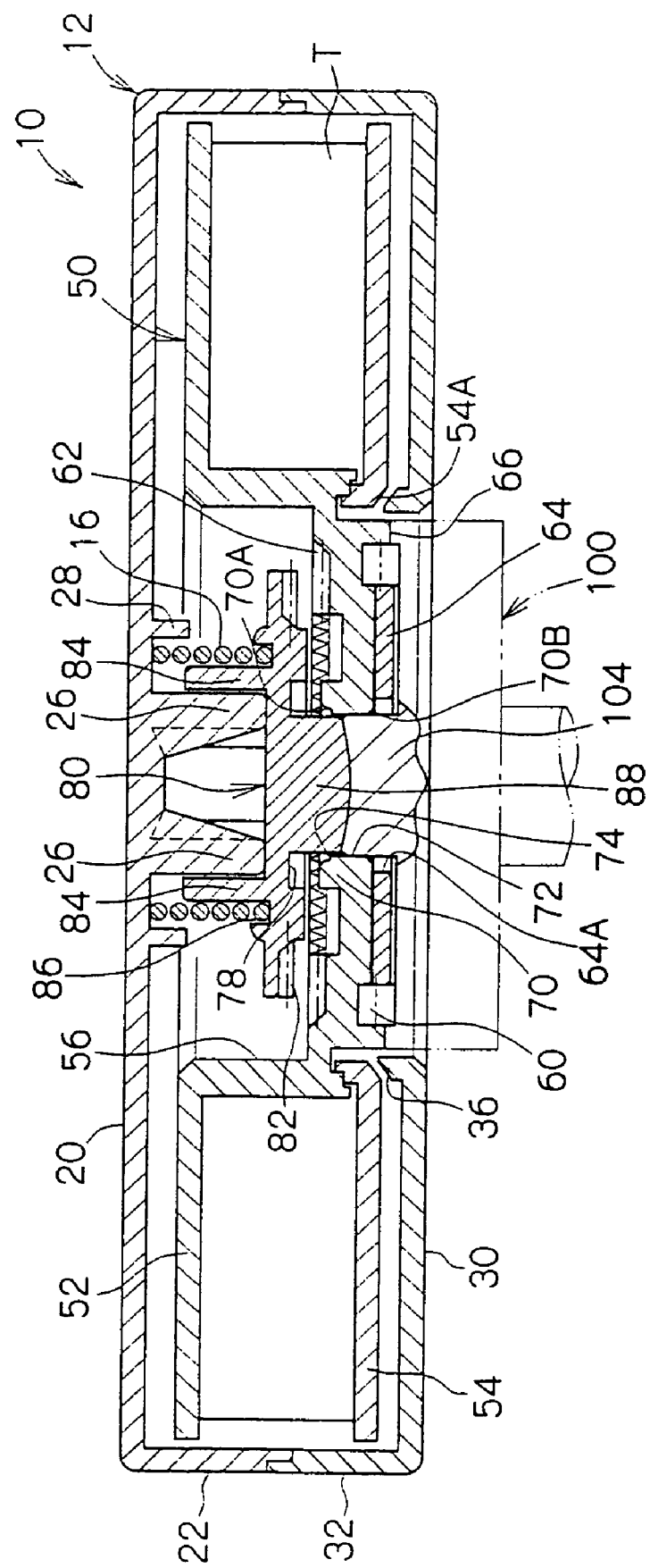
FIG. 4 is a schematic side sectional view showing a state after the rotating shaft meshes with the recording tape cartridge.
Figure 5:
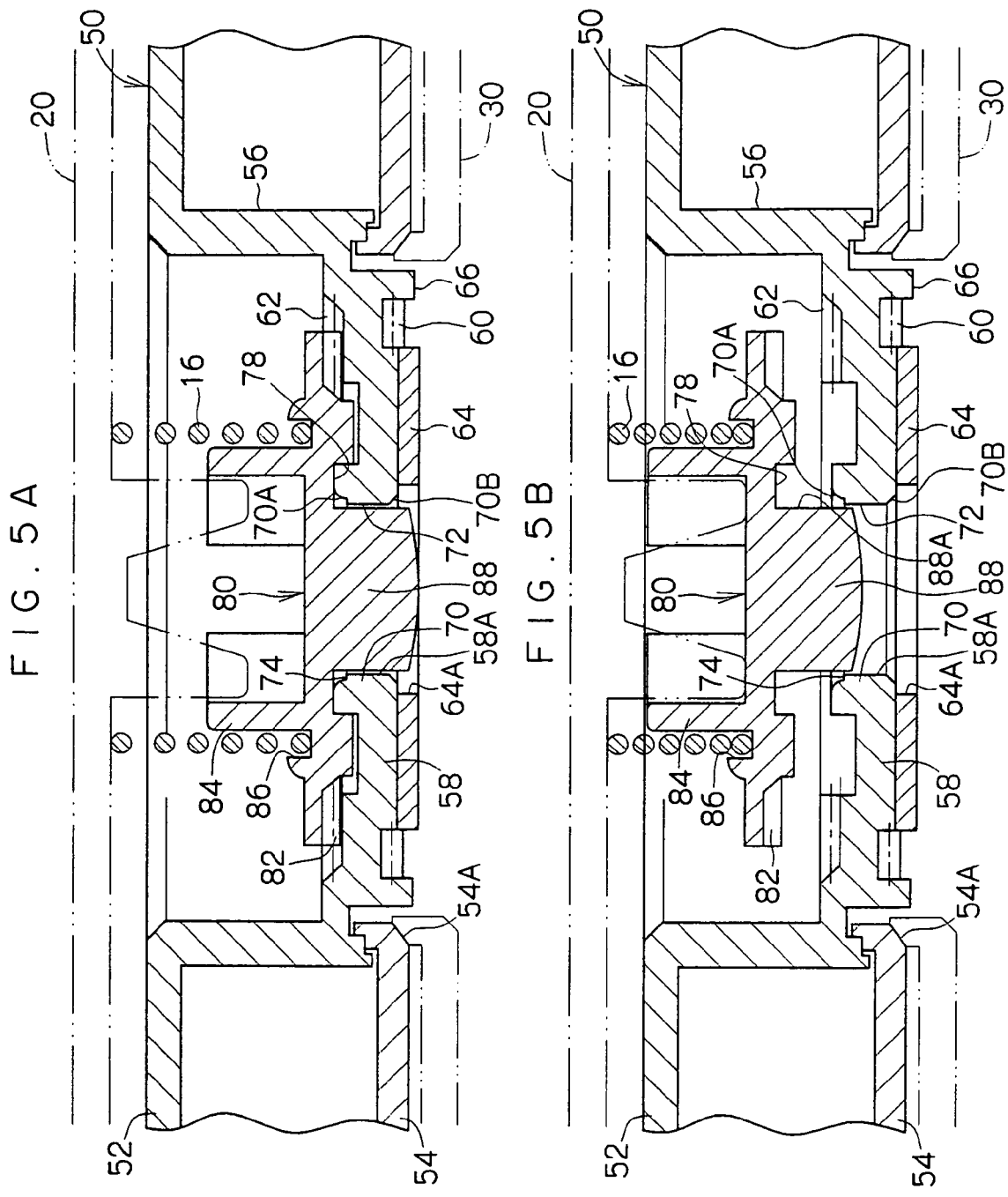
FIGS. 5A and 5B are schematic side sectional views, a portion of which is enlarged, showing the configurations of the reel and the braking member.
Figure 6:
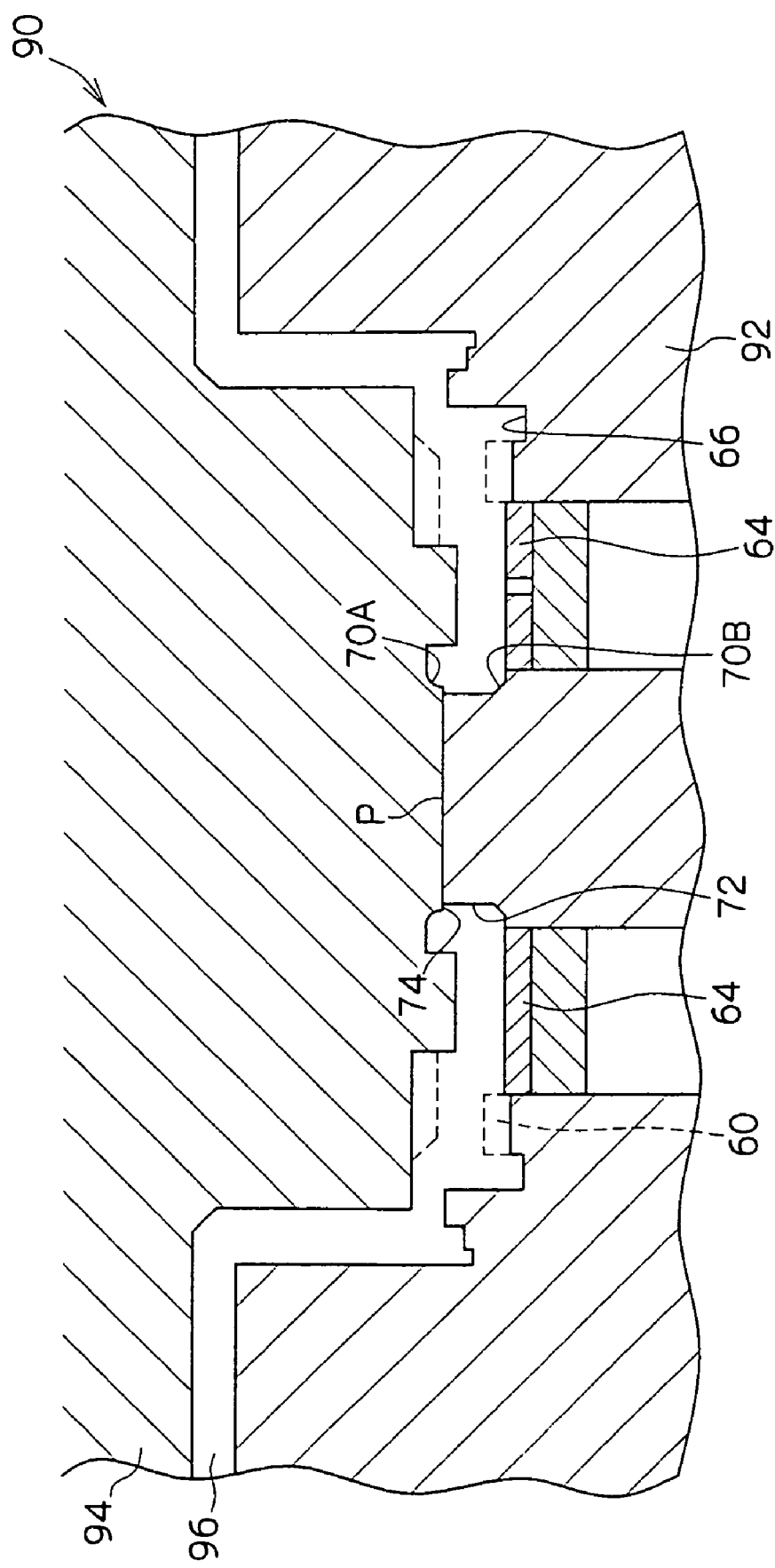
FIG. 6 is a schematic side sectional view showing a mold for molding a reel hub and an upper flange.
Figure 7:
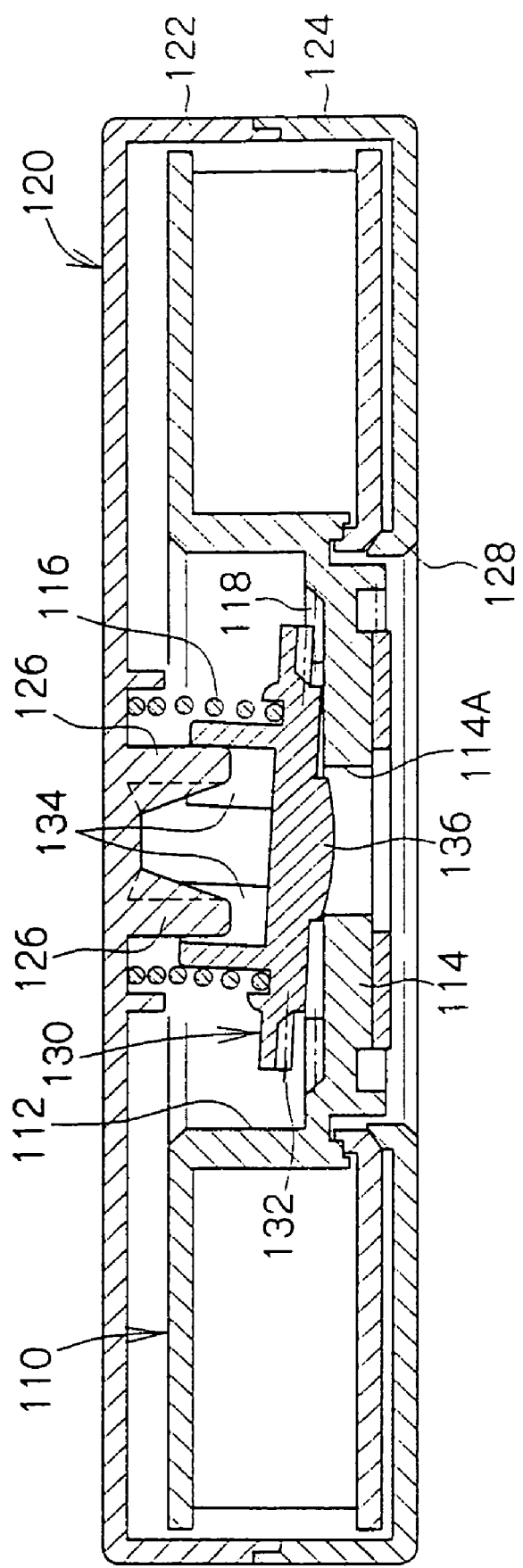
FIG. 7 is a schematic side sectional view showing a conventional recording tape cartridge.

In FIGS. 3 through 5, a step portion 74 is shown between the straight portion 72 and the arc-shaped surface 70A. This step portion 74 is formed for the molding. Namely, as shown in FIG. 6, the reel hub 56 and the upper flange 52 are molded integrally by clamping a mold 90 and filling a molding material (a resin material) into a cavity 96 which is formed by a fixed mold plate 92 and a movable mold plate 94. The position at which the step portion 74 is formed is a border portion (i.e., a parting line) P between the fixed mold plate 92 and the movable mold plate 94 at the floor wall 58 portion.

This is because, if the arc-shaped surface 70A is not molded at the movable mold plate 94, the molded product cannot be removed from the fixed mold plate 92. Accordingly, the step portion 74 is formed, but the step portion 74 actually only has a width of about 0.05 μ. Accordingly, the operation projection 88, which is guided by the arc-shaped surface 70A, is not affected by the step portion 74, and is smoothly inserted into the pass-through hole 58A.

Further, as shown in FIG. 6, when the region where portions extended from the upper flange 52 and the rotating shaft 100 of the drive device are engaged, i.e., the straight portion 72 of the guide wall portion 70 which the releasing projection 104 slidingly contacts or the annular projection (the reference surface) 66 which the top surface 108 abuts, is molded by the one mold plate which molds the reel gear 60 (in this case, the fixed mold plate 92), there is the advantage that the dimensional accuracy of these portions with respect to the reel gear 60 is high.

Moreover, there are cases in which the inner side of the bottom end portion of the guide wall portion 70 is chamfered in an annular form so as to form a taper surface 70B. In accordance therewith, the releasing projection 104, which has substantially the same diameter as the pass-through hole 58A, is smoothly inserted in the pass-through hole 58A. Further, because the straight portion 72 is a vertical surface, when the molded product is removed from the fixed mold plate 92, it is easy for resistance to releasing from the mold to arise. However, when such a taper surface 70B is formed, the resistance to releasing from the mold can be decreased.

Further, although the through hole 64A of the illustrated reel plate 64 is formed to have a diameter which is slightly (1 mm or less) greater than that of the pass-through hole 58A as described above, the through hole 64A may be formed to have substantially the same diameter as the pass-through hole 58A. However, if the through hole 64A of the reel plate 64 has a greater diameter than that of the pass-through hole 58A, it is possible to reliably avoid the releasing projection 104 of the drive device interfering with the reel plate 64.

An annular concave portion 78, with which the guide wall portion 70 engages, is formed at the bottom surface of the braking member 80. Namely, as shown in FIG. 5A, the annular concave portion 78, in which the upper end portion of the guide wall portion 70 is inserted to a predetermined depth when the recording tape cartridge 10 is not being used (i.e., when the braking member 80 is at the locking position), is formed. Accordingly, when the recording tape cartridge 10 is not being used, due to the upper end portion of the guide wall portion 70 being inserted in the annular concave portion 78, this portion is a labyrinthine (maze-like) structure. Entry of dust and the like can be suppressed thereby.

Further, as shown in FIG. 5B, even if the operation projection 88 (the braking member 80) is raised up to the position at which rotation of the reel 50 is permitted, and is raised up further to the uppermost heightwise position with respect to the case 12, the operation projection 88 does not come out of the guide wall portion 70. Namely, the guide wall portion 70 extends upward (toward the braking member 80) such that the straight portion 72 of the guide wall portion 70 always faces a side surface (peripheral surface) 88A of the operation projection 88.

Accordingly, even if the user pushes the operation projection 88 (the braking member 80) upward in fun or the like, owing to the guide wall portion 70, the operation projection 88 does not come out from the pass-through hole 58A. Therefore, problems such as the braking member 80 being anchored in a tilted state do not arise. Note that, when the operation projection 88 is at the aforementioned uppermost position, there are cases in which the heightwise direction length over which the operation projection 88 and the guide wall portion 70 oppose one other is 1 mm or more. Further, with such a structure, the releasing of the locking of the reel 50 by the releasing projection 104 of the drive device can be carried out stably.

In addition, as shown in FIG. 1, a leader block 40 is attached to the distal end portion of the magnetic tape T due to an elastic pin 46 and the distal end of the magnetic tape T being fit into a concave portion 42 of the leader block 40. Cut-out portions 29, 39 forming an opening 18 are formed at the front right corner portions of the peripheral wall 22 of the upper case 20 and the peripheral wall 32 of the lower case 30, respectively.

The opening 18 is for enabling the magnetic tape T, which is wound on the outer peripheral surface of the reel hub 56 of the reel 50, to be pulled out to the exterior. When the recording tape cartridge 10 is not being used, the leader block 40 is anchored on the peripheral edge of the opening 18 and closes the opening 18. When the recording tape cartridge 10 is to be used, an unillustrated pull-out means provided at the drive device engages with an engagement portion 44 formed at the distal end of the leader block 40, and the leader block 40 is thereby pulled-out from the opening 18. Note that the structure attached to the distal end portion of the magnetic tape T is not limited to the leader block 40. An unillustrated door or the like may be provided, and a leader tape, a leader pin or the like may be attached to the distal end portion of the magnetic tape T.

Operation of the recording tape cartridge 10 having the above-described structure will be described next. When the recording tape cartridge 10 is not being used (i.e., is not loaded in a drive device, such as during storage or transportation thereof or the like), the opening 18 is closed by the leader block 40. When the recording tape cartridge 10 is to be used, it is loaded along the direction of arrow A into a drive device with the front side peripheral walls 22, 32 thereof leading.

When the recording tape cartridge 10 is loaded (inserted) in the drive device, either the recording tape cartridge 10 is lowered a predetermined height or the rotating shaft 100 is raised, such that the releasing projection 104 pushes the operation projection 88 upward and the meshing of the engaging gear 62 and the braking gear 82 is released. At this time, the releasing projection 104 is inserted into the pass-through hole 58A with substantially no gap therebetween and slidingly contacts the straight portion 72 of the guide wall portion 70, such that positioning of the reel 50 in the left-fight direction (i.e., centering) is carried out.

Moreover, the top surface 108 of the rotating shaft 100 abuts the annular projection 66 so as to position the reel 50 in the heightwise direction, and the reel plate 64 is attracted by the magnet 106. In this way, the recording tape cartridge 10 (the reel 50) is positioned accurately within the drive device. In this state, the driving gear 102 meshes with the reel gear 60.

The pull-out member (not shown) structuring the pull-out means of the drive device engages with the engaging portion 44 of the leader block 40, and pulls the leader block 40 out from the case 12. At this time, because the recording tape cartridge 10 is positioned accurately within the drive device, the pull-out member can reliably engage the engaging portion 44 of the leader block 40. In this way, the leader block 40, which is pulled-out from the recording tape cartridge 10, is accommodated in a fit-in portion formed in the reel hub (not illustrated) of the take-up reel of the drive device.

When the leader block 40 is accommodated in the fit-in portion of the take-up reel, the reel 50 and the take-up reel are driven to rotate synchronously by the rotating shaft 100. In this way, while being taken-up onto the take-up reel, the magnetic tape T is successively pulled-out from the interior of the recording tape cartridge 10, and data is recorded onto the magnetic tape T or data recorded on the magnetic tape T is played-back by a recording/playback head disposed along a predetermined tape path.

Thereafter, when the recording tape cartridge 10 is to be ejected from the drive device, first, the magnetic tape T is rewound onto the reel 50 and the leader block 40 closes the opening 18. Then, due to the recording tape cartridge 10 being raised up or the rotating shaft 100 being lowered, the magnet 106 moves away from the reel plate 64, the releasing projection 104 is pulled-out from the interior of the pass-through hole 58A, and the meshing of the driving gear 102 and the reel gear 60 is cancelled.

At this time, the operation projection 88 is urged downward by the compression coil spring 16. Therefore, as the releasing projection 104 is pulled-out from the interior of the pass-through hole 58A, the braking member 80 moves to its lower position (locking position), and the braking gear 82 meshes with the engaging gear 62. In this way, a locked state arises in which inadvertent rotation of the reel 50 is impeded. Then, the recording tape cartridge 10 which is in this state is moved in the direction opposite to the direction of arrow A by an unillustrated ejecting mechanism, so as to be discharged out from the interior of the drive device.

As described above, the operation projection 88 of the braking member 80 does not come out from the pass-through hole 58A due to the guide wall portion 70 standing upright within the reel hub 56. Thus, even if a user carelessly pushes-in the operation projection 88 in the case 12, the problem which arose in the conventional art of the braking member 80 becoming anchored in a tilted state does not arise. Note that the structure of the braking member 80 is not limited to the illustrated structure, and the same holds for a case in which the braking member and the operation projection are structured as separate members.

The annular concave portion 78, into which the upper end portion of the guide wall portion 70 is inserted (engaged) to a predetermined depth), is formed at the braking member 80, such that this region is a labyrinthine (maze-like) structure. Thus, it is possible to suppress entry of dust and the like in from the pass-through hole 58A (i.e., from the gap between the guide wall portion 70 and the operation projection 88) when the recording tape cartridge 10 is not being used. Accordingly, the problem of dust and the like adhering to the magnetic tape T does not arise.

What is claimed is:

1. In combination:
   a recording tape cartridge and a drive device having a releasing portion, said cartridge comprising:
   a reel rotatably accommodated within a case, a recording tape being wound around an outer peripheral surface of a hub of the reel, which hub is shaped as a hollow cylinder having a floor wall and in whose axially central portion a pass-through hole is formed; and
   a braking member provided so as to be unable to rotate within the case, the braking member being able to be set at a locking position, at which the braking member engages with an engaging portion formed at a top surface of a floor portion of the floor wall of the hub and impedes rotation of the reel, and a permitting position, at which the braking member permits rotation of the reel when engagement with the engaging portion is cancelled due to the braking member moving away from the top surface of the floor portion of the hub due to pushing-up of an operation portion, of the braking member, which is inserted through the pass-through hole, said operation portion having an uppermost limit position, wherein there is formed, in said floor wall at a peripheral edge portion of the pass-through hole, a guide wall portion which extends toward the braking member and always opposes a side surface of the operation portion so that the operation portion does not come out of the guide wall portion even in said uppermost limit position and prevents tilting of the brake member, wherein an annular concave portion, having an uppermost surface, which engages with the guide wall portion in said locking position, is formed in the braking member to form a labyrinthine path which suppresses entry of dust into said case through said pass-through hole;

wherein said releasing portion of said drive device, which releasing portion pushes-up the operation portion, is inserted in the pass-through hole substantially without a gap therebetween; and wherein the braking member is formed in a shape of a disc accommodated within the hub so as to be movable upward and downward, and the braking member has an integral braking gear which is provided in an annular form at an outer peripheral portion of one surface of the braking member.

2. The combination of claim 1, wherein the case has an upper case and a lower case, and a pair of rotation restricting ribs are provided at a center of an inner surface of the upper case, and an annular projection is provided at an outer side of the rotation restricting ribs, and the braking member has a pair of engaging projections, which are formed in substantial U-shapes in plan view, and an annular groove, which is provided at an outer side of the engaging projections, and an elastic urging member can be held between the annular projection and the annular groove.

3. The combination of claim 1, wherein the operation portion includes an operation projection which is substantially solid and cylindrical, and which is provided at a center of one surface of the braking member.

4. The combination of claim 3, wherein an inner peripheral surface of the guide wall portion is a straight portion which is a surface perpendicular to the floor wall of the hub.

5. The combination of claim 3, wherein the guide wall portion has, at an inner side of one end portion of the guide wall portion, a surface which is arc-shaped in side sectional view and which is for guiding-in the operating projection.

6. The combination of claim 3, wherein the guide wall portion has, at an inner side of one end portion of the guide wall portion, a taper surface which is chamfered in an annular form.

7. The combination of claim 4, wherein a reel gear is formed in an annular form at one surface of the floor wall, and at least the straight portion and an annular projection of the floor wall are molded by a same mold plate which molds the reel gear.

* * * * *